Jan. 21, 1936.   J. J. O'BRIEN ET AL   2,028,293
UNDERCUTTING ATTACHMENT FOR LATHES
Filed Jan. 11, 1935   2 Sheets-Sheet 1
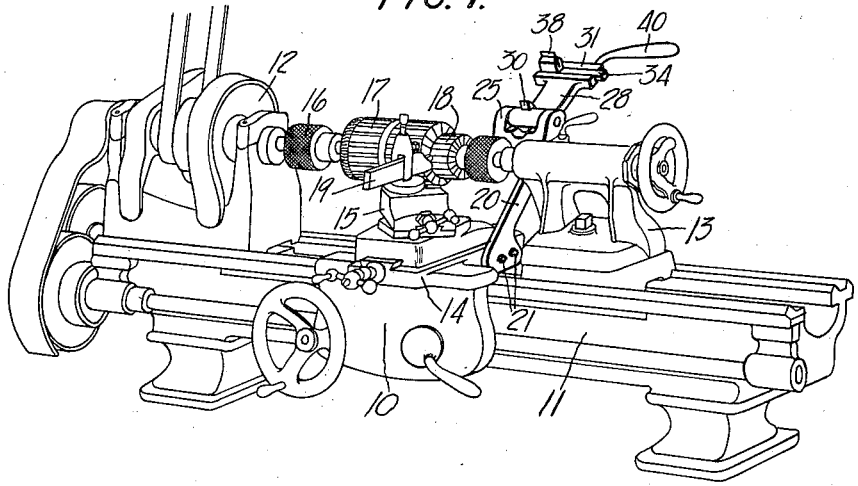
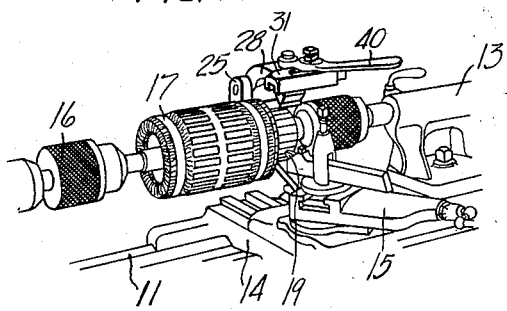
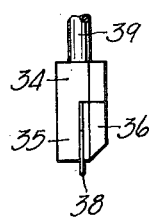
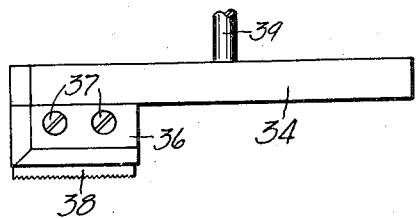
INVENTORS
JOHN J. O'BRIEN.
MILES W. O'BRIEN.
BY
ATTORNEY.

Jan. 21, 1936.   J. J. O'BRIEN ET AL   2,028,293
UNDERCUTTING ATTACHMENT FOR LATHES
Filed Jan. 11, 1935    2 Sheets-Sheet 2

INVENTORS
JOHN J. O'BRIEN.
MILES W. O'BRIEN.
BY
ATTORNEY.

Patented Jan. 21, 1936

2,028,293

UNITED STATES PATENT OFFICE 2,028,293

UNDERCUTTING ATTACHMENT FOR LATHES

John J. O'Brien and Miles W. O'Brien, South Bend, Ind.

Application January 11, 1935, Serial No. 1,325

11 Claims. (Cl. 82—34)

This invention relates to undercutting attachments for lathes, and particularly to means for accurately undercutting laminations and the like of a cylindrical member mounted on a lathe, such as mica laminations of a motor commutator.

The principal object of the invention is to provide simple, manually operated means for accurately, uniformly and quickly undercutting an object mounted on a lathe.

A further object is to provide a device of this character which may be mounted on a lathe saddle and positioned externally of the work area of the lathe whereby normal operation of the lathe is not interfered with by the device while the device is not in operation.

A further object is to provide a device of this character for providing an adjustable depth of undercut.

A further object is to provide a device of this character provided with a cutter, means for manually operating said cutter, and means for guiding said cutter in a straight path of movement.

A further object is to provide a device of this character in which a cutter is operatively mounted and guided by means retained against horizontal movement by the lathe.

Other objects will be apparent from the following description and claims.

In the drawings:

Figure 1 is a perspective view illustrating the undercutting attachment applied to a lathe and disposed in inoperative position.

Figure 2 is a fragmentary perspective view of a lathe mounting the undercutting attachment in operative position.

Figure 5 is a side elevation of the cutter and its carrier.

Figure 6 is an end view of the cutter and carrier.

Figure 3:
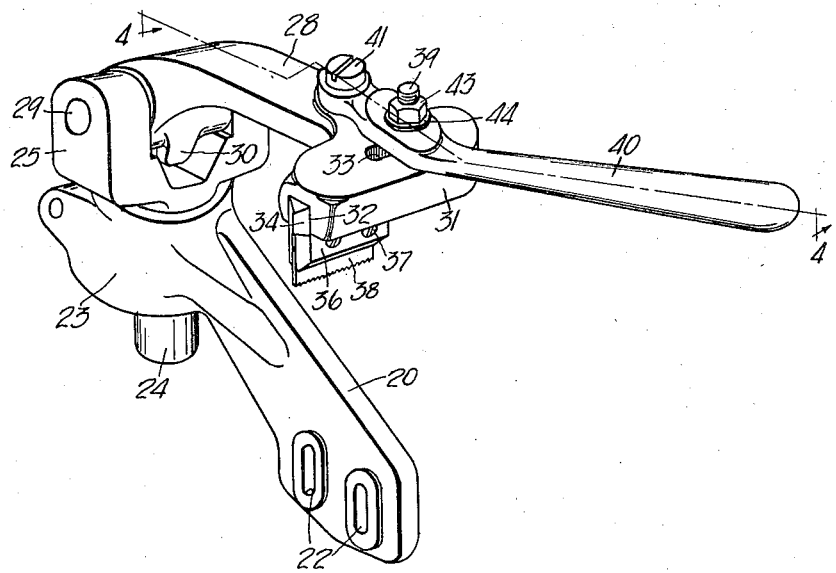
Figure 3 is a perspective view of the undercutting attachment.
Figure 4:
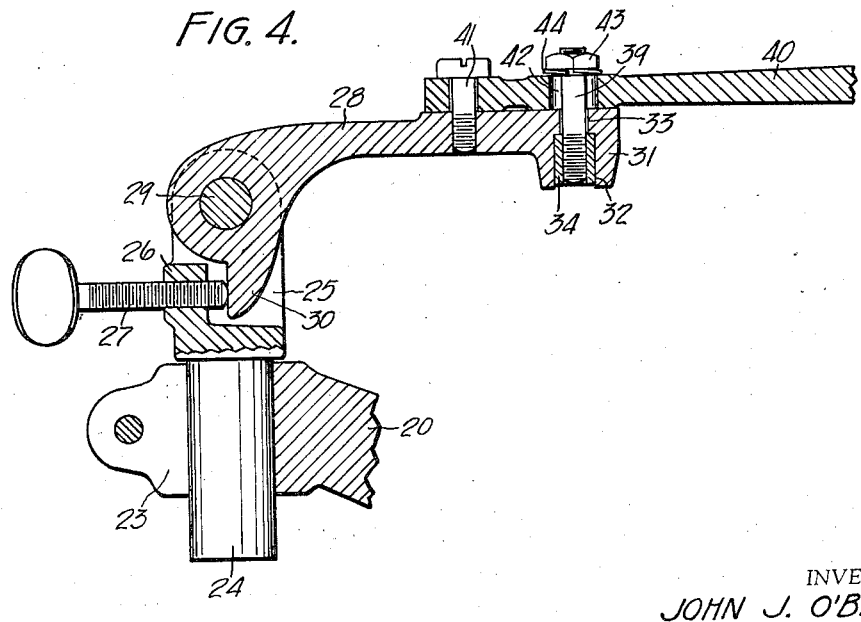
Figure 4 is a fragmentary vertical sectional view of the undercutting attachment taken on line 4—4 of Figure 3.

Referring to the drawings, which illustrate the preferred embodiment of the invention, the numeral 10 designates a lathe comprising a lathe bed 11, headstock 12, tailstock 13, saddle 14, and tool holder 15, all of conventional construction. Suitably mounted between the headstock and tailstock by means of chucks 16 or the like is a motor armature 17 whose commutator 18 is adapted to be trued by cutter 19 carried by the tool holder 15.

The undercutting attachment for the lathe comprises a support 20 adapted to be adjustably secured at its lower end to saddle 14 by means of bolts 21 which pass through spaced vertically elongated slots 22 in said support. The support 20 extends angularly rearwardly upwardly and terminates in a split head 23 spaced rearwardly of the motor commutator. A vertical shaft 24 is adjustably clamped in head 23 and mounts a yoke 25 at its upper end, said yoke including a central boss 26 at its rear side through which an adjusting screw 27 is threaded. An arm 28 is pivotally mounted at one of its ends to said yoke by pin 29 whose axis is disposed in parallel relation to lathe bed 11, said arm 28 normally extending forwardly from said yoke to a position above the work, as commutator 18. A projecting lug 30 is carried by the pivoted end of arm 28 and engages screw 27 which serves to adjust the vertical position of the outer end of said arm relative to the work. At its free end the arm 28 is provided with an elongated head 31 extending transversely of said arm. At its under side the head 31 is provided with a longitudinally extending guide groove 32 with which a parallel elongated slot 33 extending vertically through head 31 communicates, said slot 33 being positioned substantially centrally of said head.

Slidably mounted in groove 32 of head 31 is an elongated horizontal guide bar 34 which is provided with a downwardly extending portion 35 at one end thereof, said part 35 being of about one-half the width of bar 34. A part 36 complementary to part 35 is detachably secured to part 35 by means of screws 37, and between these parts 35 and 36 is clamped a cutter 38, for instance a part of a hack saw blade, in a position extending below head 31 and carrier 35, 36 in parallel relation thereto and substantially vertically disposed when in operative position. An upwardly extending pin 39 is threaded in a suitable tapped opening centrally of bar 34 and extends through slot 33 of head 31. A handle 40 is pivoted at one end thereof to arm 28 at 41 in rearwardly spaced relation to slot 33 of head 31. In spaced relation to pivot 41, the lever 40 is provided with a longitudinally extending elongated slot 42 through which the upper end of pin 39 loosely extends. At its upper end the pin 39 mounts a nut 43 and a lock washer 44 bearing on head 31 by which the guide bar is firmly held with respect to said head 31.

In the use of the device, the motor commutator 18 having first been trued by tool 19, the adjusting screw 27 is set to limit the downward movement of arm 28 by engagement thereof by lug 30 and thus to limit the cut which may be made by cutter 38. The arm 28 is then forwardly pivoted or positioned, as shown in Figure 2, and the armature is rotated to position one of the mica laminations of the commutator in alignment with cutter 38, the cutter being preferably positioned in spaced relation to the adjacent end of the commutator by handle 40 to facilitate freedom of movement of the armature. The parts having been thus operatively positioned, the handle 40 is pivoted back and forth with the concurrent application of downward pressure to the cutter, as through downward pressure on the handle, to reciprocate the cutter and provide the undercut of the laminations. Only a few passes of the cutter over each lamination is generally required to effect an undercut of the desired depth. After each successive undercut is made the cutter is shifted longitudinally to a position clear of the commutator to leave the armature free for rotation to align the succeeding mica lamination with the cutter, it being thus unnecessary to raise the arm 28 between successive cuts. Furthermore, the armature having been properly centered on the lathe before the truing operation and the depression of the cutter being limited by the screw 27 and lug 30, absolute uniformity of depth of cut of each lamination is assured. It will also be seen that considerable flexibility of use of the device is imparted by its construction, so that, if the commutator laminations do not extend in true alignment with the armature axis and with the cutter, the flexible character of the blade of the cutter coupled with the freedom of rotation of the armature on the lathe permit the operator to manipulate the device to take care of the commutator deformity and achieve the desired uniform undercut.

After use of the device is completed, the arm 28 is upwardly and rearwardly pivoted to the position illustrated in Figure 1, wherein a portion of the normally upper face of the pivoted end of the arm 28 engages the boss 26 to maintain said arm 28 in a substantially horizontal position extending rearwardly from yoke 25. In this inoperative position of the device, operation of the lathe and application to and removal from the lathe of the armature or other work can be accomplished without interference from the device; so that the same may remain permanently attached to the lathe even for types of work in which it plays no part.

The invention having been set forth, what is claimed as new and useful is:—

1. A device for undercutting work mounted on a lathe, comprising a support secured to the lathe beneath the work and extending upwardly to a position spaced rearwardly of the work, an arm pivoted to said support about an axis parallel to the work and normally extending forwardly therefrom to a position above the work, a reciprocable member guided by said arm, a cutter carried by said member and engaging the work, and manually operated means for simultaneously reciprocating said member relative to said arm and downwardly pivoting said arm.

2. A device for undercutting work mounted on a lathe, comprising a support carried by the lathe and terminating in laterally spaced relation to the work, a cutter engageable with the work, a cutter carrier pivotally mounted by said support, manually operable means for reciprocating said cutter relative to said carrier and longitudinally of the work and for simultaneously pressing the cutter against the work, and means for limiting the depth of cut made by said cutter.

3. A device for undercutting work mounted on a lathe, comprising a support carried by the lathe and terminating rearwardly of the work, a normally forwardly extending carrier pivoted to said support, a cutter engageable with the work and reciprocably mounted by said carrier, a handle pivoted to said carrier and for reciprocating said cutter relative to said carrier, and means for limiting the cut of the cutter on said work by limiting pivotal movement of said carrier relative to said support including an adjustable stop.

4. A device for undercutting work mounted on a lathe, comprising a support carried by said lathe beneath the work and extending around said work to terminate thereabove, a member mounted by the end of said support for reciprocation relative to said support and longitudinally of the lathe, a cutter carried by said member for engagement with the work, a handle pivoted to said support, and means connecting said handle and member for reciprocating said member and depressing said cutter upon actuation of said handle.

5. A device for undercutting work mounted on a lathe, comprising a support carried by said lathe and terminating adjacent the work, the end of said support having an elongated slot therein, a handle pivoted to said support having a longitudinal slot therein spaced from the pivot thereof and partly registering with said first slot, a cutter, and means mounting said cutter and including a portion extending through said slots, said means being actuable by said handle to reciprocate said cutter guided by said first named slot.

6. A device for undercutting work mounted on a lathe, comprising a support carried by said lathe and extending around said work to terminate thereabove, the upper end of said support having an elongated slot extending transversely thereof and parallel to the axis of said work, and an elongated groove communicating with said slot and extending parallel thereto, a handle pivoted to said support and having a longitudinal slot therein spaced from the pivot thereof and partly registering with said first named slot, and a cutter head mounted for reciprocation in said groove and including a portion passing through said slots for actuation of said cutter by said handle.

7. A device for undercutting work mounted on a lathe, comprising a support mounted on the lathe and including a guide, a cutter cooperating with said guide, and means for reciprocating said cutter relative to said support and for simultaneously pressing said cutter against the work.

8. A device for undercutting work mounted on a lathe, comprising a support carried by the lathe, a cutter mounted by said support for guided reciprocation relative to said support longitudinally of the work at the upper side thereof, a handle pivoted to said support and operatively connected with said cutter for reciprocating the cutter relative to said support and simultaneously depressing the cutter, and means associated with and adjusting said support relative to the work to limit the depth of cut in the work made by said cutter.

9. A device for undercutting work mounted on a lathe, a cutter engageable with the work, a support carried by the lathe and including a vertically shiftable portion mounting said cutter, and manually operable means associated with said cutter mounting portion for reciprocating said cutter relative to said support and to the work and for depressing said cutter mounting portion.

10. A device for undercutting work mounted on a lathe, comprising a cutter engageable with the work, a support carried by the lathe and including a vertically shiftable portion mounting said cutter, means simultaneously operable to reciprocate said cutter relative to said support and longitudinally of the work and to depress said cutter mounting portion, and means for limiting downward movement of said cutter mounting portion.

11. The combination with a lathe having a head and tail stock for mounting work and a saddle beneath said work, of means for longitudinally undercutting said work comprising a support fixed to said saddle and extending rearwardly upwardly therefrom in spaced relation to the work, an arm pivoted on a horizontal axis at the upper end of said support, the free end of said arm being normally spaced above the work and provided with an elongated guide parallel to the axis of the work, a handle pivoted on a vertical axis to said arm in spaced relation to said guide, and a cutter reciprocable relative to said arm by said handle under the control of said guide.

JOHN J. O'BRIEN.
MILES W. O'BRIEN.